United States Patent [19]

Chao

[11] Patent Number: 4,846,657

[45] **Date of Patent: * Jul. 11, 1989**

[54] DIE FOR EXTRUDING ULTRAFINE HONEYCOMB STRUCTURES

[75] Inventor: Tai-Hsiang Chao, Mount Prospect, Ill.

[73] Assignee: Allied-Signal Inc., Morristown, N.J.

[ * ] Notice: The portion of the term of this patent subsequent to May 10, 2005 has been disclaimed.

[21] Appl. No.: 188,825

[22] Filed: May 2, 1988

[51] Int. Cl.[4] .......... B29C 47/00

[52] U.S. Cl. .......... 425/190; 264/177.12; 425/192 R; 425/461; 425/464; 425/466; 425/467

[58] Field of Search .......... 425/464, 466, 192 R, 425/467; 264/177.12

[56] References Cited

U.S. PATENT DOCUMENTS

| | | | |
|---|---|---|---|
| 1,152,978 | 9/1915 | Royle . | |
| 3,559,252 | 2/1971 | Schmidt et al. | 25/17 |
| 3,778,217 | 12/1973 | Bustamante et al. | 425/467 |
| 3,790,654 | 2/1974 | Bagley | 264/177 |
| 3,824,196 | 7/1974 | Benbow et al. | 252/455 R |
| 3,905,743 | 9/1975 | Bagley | 425/464 |
| 4,168,944 | 9/1979 | Morikawa et al. | 425/464 |
| 4,468,366 | 8/1984 | Socha, Jr. | 264/177 R |
| 4,550,005 | 10/1985 | Kato | 264/177 R |
| 4,731,010 | 3/1988 | Cunningham | 425/461 |
| 4,743,191 | 5/1988 | Chao | 425/190 |
| 4,747,986 | 5/1988 | Chao | 264/177.11 |
| 4,767,309 | 8/1988 | Mizuno et al. | 425/461 |

*Primary Examiner*—Jay H. Woo
*Assistant Examiner*—Khanh P. Nguyen
*Attorney, Agent, or Firm*—Harold N. Wells; Thomas K. McBride; John G. Tolomei

[57] ABSTRACT

A die for forming honeycomb structures has an arrangement that facilitates fabrication and the support of channel forming pins across the surface of the die by the use of multiple die sections. The die is used for forming multi-channeled honeycomb structures from extrudable materials. The die has a first die body that has an inlet face and outlet face and integrally formed channel forming pins that extend past the outlet face of the die. A set of integrally formed links interconnect the channeled pins and support the channeled pins from the die body. Together the channel forming pins and links define a set of cavity for passing extrudable material through the die body. The die includes at least one additional die body, which is at least partially superimposed above the inlet face of the first die body. The additional die body has an inlet face, an outlet face, and an integrally formed set of channel forming pins that extend through the cavities in the first die body and past the outlet face of the first die body. Another set of integral links interconnect the channel forming pins of the additional die body. The extension of the pins from the first die body and any additional die body together define a discharge zone which completes the formation of a multi-channeled honeycomb structure as the extrudable material passes through the die. Each set of pins in the die bodies have a minimum pitch between all adjacent pins that exceeds the minimum pitch between all the adjacent pins in the discharge zone. The die is particularly useful in the formation of ultrafine honeycomb structures having a channel density of 600 channels per square inch or more.

13 Claims, 5 Drawing Sheets

*Fig. 4*
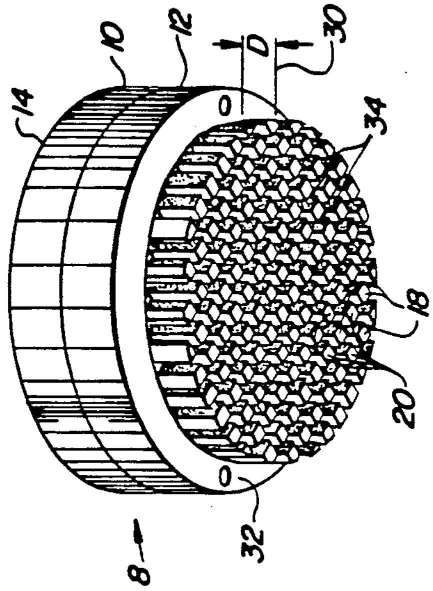
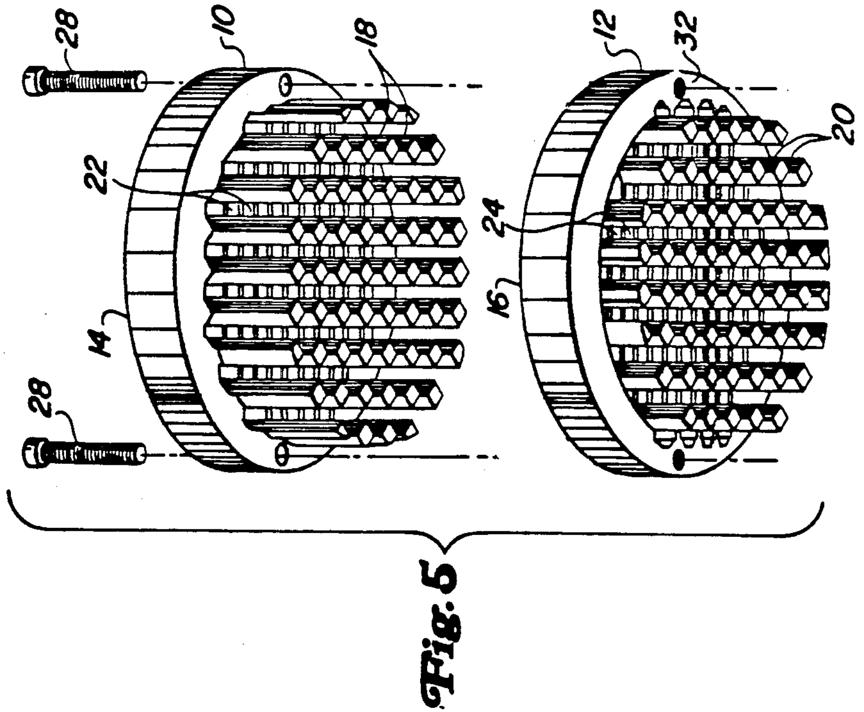
*Fig. 5*

DIE FOR EXTRUDING ULTRAFINE HONEYCOMB STRUCTURES

BACKGROUND OF THE INVENTION

This invention relates generally to honeycomb structures formed of ceramic materials. More specifically, this invention relates to the fabrication of dies for forming ceramic materials into thin wall honeycomb structures by extrusion.

DESCRIPTION OF THE PRIOR ART

The term "honeycomb structures" is used generally to describe a thin walled body having a series of regularly or irregularly shaped parallel channels that extend continuously over the length of the body and are separated by wall elements that give the body its structure. The cross-section of each channel may vary from channel to channel but usually will have a regular geometric shape. These honeycomb structures find use in regenerators, heat exchange equipment, filters, and as catalyst carriers. The use of such carriers is also well known in the treatment of automotive exhaust gases where the carriers are typically treated with a wash coat of catalytic material.

Ceramic honeycombs have been formed by extrusion methods. The extrusion method uses a hydraulic ram to push the extrudable material into a series of feed passages which communicate with a discharge area. The discharge area has a series of projections generally in the form of pins, that displace the extrudable material from the sections that will eventually correspond to the channels of the extrusion, and define a series of gaps which shape the extrudable material into the walls of the honeycomb structure. It has become common practice to extrude honeycombs having channel densities of from 80 to 450 channels per square inch upon extrusion, and 100 to 600 channels per square inch after shrinkage of the extrudable material during curing. Typically, the wall thicknesses between the channels of the honeycomb structure will vary between 0.002 inch and 0.050 inch. Methods and apparatus for forming honeycomb structures are further described in a number of U.S. patents.

In order to increase the surface area, higher channel densities are sought for honeycomb structures. Honeycomb structures having channel densities of 600 or more channels/square inch, referred to as ultrafine honeycomb structures, have been fabricated As the channel densities continue to increase, fabricating a die for forming the honeycomb structures becomes more difficult due to reduced clearances between adjacent pins which may approach as little as 0.003 inch. Fabricating a die with such small clearances greatly increases the cost and complexity of the necessary fabrication methods.

In addition, the increased resistance to flow by the extrusion of ultrafine honeycomb structures, as compared to larger channel structures also imposes a greater load on the pins and the members for supporting the pins across the surface of the die. Reducing the number of pins supported across a given die surface will lower the loading thereby permitting the use of small connections between pins.

The increased number of pins and the possible requirement of stronger interconnections between pins also complicates the design of the feed passages that communicate the extrudable material to the discharge zone. The base material of the die that defines the feed passages also supports the channel forming pins. Base material needed for pin support restricts the feed passage area of the die. This restriction limits the amount of feed passage area that will have direct axial alignment with slots in the discharge zone. Direct axial alignment of the feed passages with the slots of the discharge zone is desirable to reduce the lateral flow of extrudable material and thereby increase the knitting of channel walls and the overall strength of the honeycomb structure. Furthermore the overall strength of an extruded honeycomb structure is enhanced by having a uniform arrangement of points where the feed passages communicate with the slots of the discharge zone so that the necessary flow path of extrudable material is about the same for all channels. When designing a die for extruding ultrafine honeycomb structures, it becomes increasingly difficult, as channels become smaller, to have a direct axial and uniform communication of the feed passages with the slots of the discharge zone. Although specialized machining techniques can be used to achieve the objectives of increased axial flow and uniform communication, these methods also complicate the fabrication of the die.

INFORMATION DISCLOSURE

U.S. Pat. Nos. 3,905,743 and 3,790,654, issued to Bagley, describe a method for forming a thin walled honeycomb extrusion that uses a die having feed passages and intersecting feed slots. Bagley claims and primarily teaches aligning the feed passages to communicate directly with the interconnections or intersections between a series of orthogonal slots.

U.S. Pat. No. 3,824,196, issued to Benbow et al., describes a method of making a thick walled honeycomb structure by passing a plastic material through a die having a series of feed passages that again intersect and communicate directly with intersecting points in a series of orthogonal slots that define the shape of the extrusion. Benbow also teaches that the feed passages should have a greater cross-sectional area than the transverse cross-sectional area of the discharge slots in order to provide sufficient material for filling the discharge slots. In Benbow, a large portion of the discharge slots are in direct axial communication with the feed passages.

U.S. Pat. No. 4,550,005, issued to Kato, teaches a method of extruding a honeycomb structure having walls of varied thickness and a die for use therein. The die and the method of Kato use feed passages having a hydraulic diameter that varies in relation to the walled portion being formed thereby. The feed passages are varied such that feed passageways associated with a thin walled portion have a relatively large hydraulic diameter, and feed passageways associated with thick wall portions have a relatively small hydraulic diameter.

U.S. Pat. No. 3,778,217, issued to Bustamante et al., teaches a die for forming multi-channeled honeycomb structures from a plastic material having channel forming pins supported from separable die body elements. The extrudable material first enters a section of the die having channel forming pins grouped about an inner central portion of the die before entering a second portion of the die wherein one or more rings of channel forming pins surround the central channel forming pins to fully define the shape of the extruded honeycomb structure.

U.S. Pat. No. 1,152,978, issued to Royle, discloses a die for manufacturing tubing having large channels from a plastic material. The plastic material first enters a die section containing spaced apart rows of channels forming pins. The extrudable materials flow past the first section to a second section that contains additional rows of channel forming pins placed between the first mentioned spaced apart rows.

U.S. Pat. No. 3,559,252, issued to Schmidt et al., depicts a die for extruding multi-channeled honeycomb structures wherein the extrudable material enters the die through a series of feed passages that are in axial alignment with the channel forming pins of the die, is directed radially outward from the feed passages, and flows into a final section of the die containing channel forming pins.

U.S. Pat. No. 4,468,366, issued to Socha, acknowledges the problem of improper knitting between channel walls by the tendency of the discharge slots to act as a continuation of the feed passages and discloses a method of forming honeycomb structures that uses a laminated die to laterally displace extrudable material into a discharge zone.

BRIEF SUMMARY OF THE INVENTION

A multi-piece die has now been discovered for extruding honeycomb structures that increases the spacing between adjacent pins and enlarges the feed passage area thereby providing additional clearances for die fabrication. In addition, the die design increases the direct axial communication of extrudable material into the discharge zone, decreases the amount of lateral flow required in the discharge zone for connecting channel walls of the honeycomb structure, and reduces the interconnections between channel forming pins that block the flow of the extrudable material. Accordingly, this invention is the first multi-piece die to have all adjacent pins in a die body section located on a pitch that exceeds the pitch between all adjacent pins in the discharge zone.

It is an object of this invention to simplify the fabrication of dies for extruding ultrafine honeycomb structures.

It is a further object of this invention to provide a die for extruding honeycomb structures that requires fewer and/or smaller interconnections between channel forming pins to support the pins across the face of the die.

Therefore, in one embodiment, this invention is a multi-piece die for forming multi-channeled honeycomb structures from extrudable material. The die includes a first die body having a first inlet face, an outlet face, and integrally formed set of channel forming pins and a set of links for interconnecting the channel forming pins. Together the channel forming pins and links define a series of feed passages in the form of a set of cavities through the die body. The channel forming pins extend below the outlet face of the die and partially define a discharge zone. At least one additional die body is superimposed, at least in part, above the inlet face of the first die body and has its own inlet face, outlet face, integrally formed set of channel forming pins, and a set of links for interconnecting the channel forming pins. The channel forming pins of the second die body extend through the cavities of the first die body and past the outlet face of the first die body to partially define more of the discharge zone. The pins have an arrangement wherein all adjacent pins in the first die body and all adjacent pins in any additional die bodies have a pitch between adjacent pins that exceeds the minimum pitch between all adjacent pins in the discharge zone.

In a more limited embodiment, this invention is a multi-piece die for forming multi-channeled extrudable structures having at least 100 channels per square inch. The die includes a first die body having an inlet face, an outlet face, and an integrally formed set of channel forming pins and webs interconnecting the channel forming pins. The channel forming pins extend from the inlet face past the outlet face and the webs provide the only attachment to the channel forming pins. Together the channel forming pins and webs define a regular pattern of cavities through the die body. At least one additional die body is superimposed above the first die body and has an inlet face and outlet face opposite the inlet face of the first die body and an integrally formed set of channel forming pins and interconnecting webs. The pins of the additional die bodies are spaced uniformly over the outlet faces. The pins of each additional die body extend from its outlet face through the cavities of the first die body and past the outlet face of the first die body. The webs in the additional die bodies provide the only attachment to the pins in the additional die bodies. The pins and webs of each additional die body define another regular pattern of cavities through each die body. Means are provided for securing the first die body and any additional die bodies together such that the cavities provide linear flow passages for passing extrudable material through the die. The portion of the pins extending beyond the outlet face of the first die body collectively define a discharge zone where the minimum pitch between the pins in the discharge zone is less than the minimum pitch between all adjacent pins in the die bodies.

Since each subportion or die body of the final die is produced separately, the additional clearance between the pins in each die body simplifies its fabrication. When the die bodies are all assembled and fixed in place to form the final die, the pins that extend into the discharge zone complement each other to provide a pin density that exceeds the pin density in all sections of the die bodies. The arrangement of the pins and webs also provides large cavities for the feed passages which can be readily formed with traditional machining techniques.

Other advantages, aspects, and embodiments of this invention are presented in the following detailed description.

BRIEF DESCRIPTION OF THE DRAWINGS

FIG. 4 is an isometric view of the discharge side or bottom of the die of FIG. 1.

FIG. 5 is an exploded view of the die of FIG. 4.

DETAILED DESCRIPTION OF THE INVENTION

Figure 1:
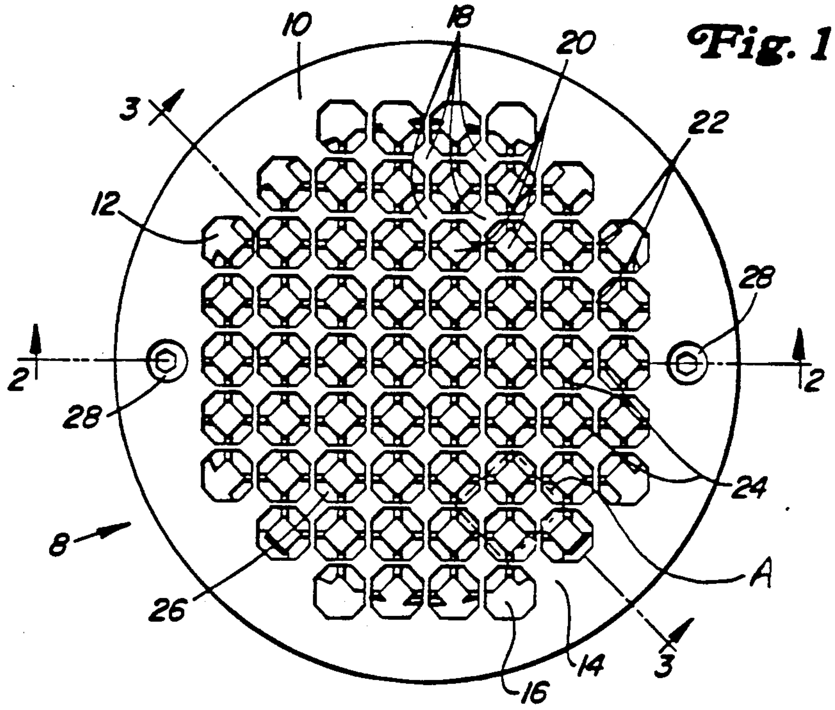
FIG. 1 is a plan view showing the inlet side or top of an extrusion die of this invention.
Figure 6:
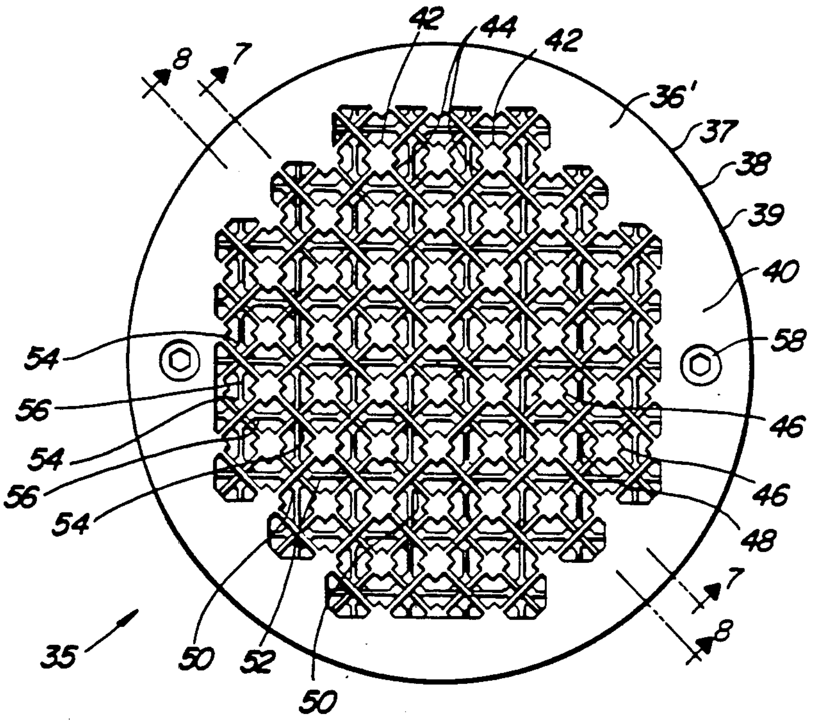
FIG. 6 is a plan view of an alternate arrangement for the die of this invention.

FIGS. 1 and 6 show plan views of the inlet side of dies having different configurations, both of which are designed in accordance with the method of this invention. The structure of the die will be explained in conjunction with the method in which the die is used. For method purposes, the term "upstream" will be used with respect to the flow of extrudable material through a die from an inlet face to an outlet face and out of the die through a discharge area.

Referring then to FIG. 1, this view depicts an extrusion die 8 having an upper die body 10 and a lower die body 12. The top faces of upper and lower die bodies 10 and 12 present inlet surfaces 14 and 16, respectively. A series of channel forming pins 18 are arranged in a rectangular grid work across the inlet face of die body 10. A similar grid work of pins 20 is arranged across the face of the lower die body 12. The spacing between the centerline of adjacent pins, referred to as the pitch, is constant in both die bodies. Pins 18 and 20 are in a relative offset pattern such that each pin in one set has a projection through the middle of pin group of another set. A series of links consisting of orthogonally arranged webs 22 and 24 for the upper and lower pin sets, respectively, act as interconnections and join the pins in each pin set and support the pins from their associated die body. These webs are designed to provide adequate support to the pins under the pressure imposed by the flow of extrudable material, which is reduced by the practice of this invention.

Extrudable material passes through the upper die body by flowing through cavities, consisting of octagonal openings defined by the lateral faces of adjacent pins and their connecting webs. The lateral surface of each set of pins and interconnected webs form a series of partitions that together represent a partitioning zone for subdividing the flow of extrudable material into a series of axially flowing segments. Although the lower die body has the same cavities or octagonal shaped openings that define another series of partitions, its openings are partially filled by the pins of the upper die body. Together, upper and lower die bodies 10 and 12 leave a space through the die that is completely open to axial flow and define a series of feed passages 26 having an irregular hexagon shape. Feed passages 26 communicate extrudable material from the inlet surface 14 of the upper die body 10 to the discharge area of the die located below webs 24. For purposes of illustration, the pins are shown in reduced size relative to the feed passages. In normal practice, the feed passages are usually much narrower in width. FIG. 1 also illustrates that the transverse cross-section of the feed passages 26 is much greater than the transverse cross-sectional area of the webs. A set of cap screws 28 provide the means for maintaining the relative spacing between the channel pins by securing the two die bodies together.

Figure 2:
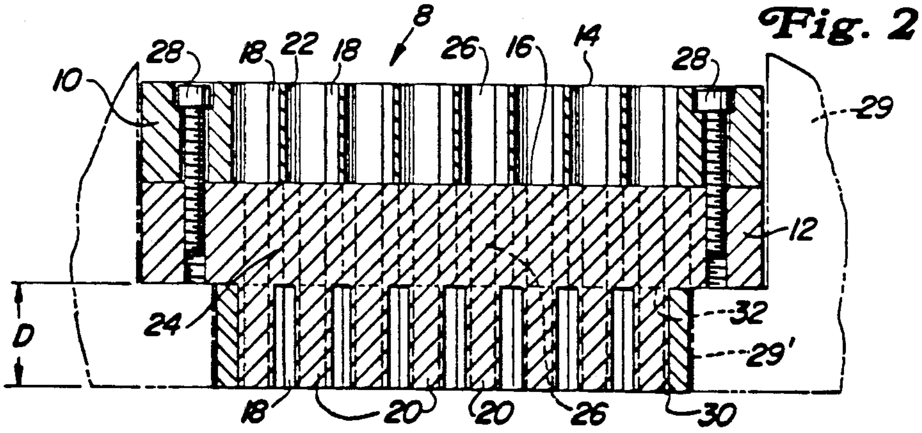
FIG. 2 shows a section of the die taken across line 2—2 of FIG. 1.

FIG. 2 shows the arrangement of the cap screws in a cross-section of the die taken parallel to and across the middle row of lower die body webs 24. Cap screws 28 extend through upper die body 10 and are treaded into the lower die body 12 to secure the two die bodies together. When in use, the entire die 8 rests in the jaws 29 of a hydraulic press that forces extrudable material against inlet surface 14. The tops of pins 18 and webs 22 extend up to inlet surface 14. Pins 18 also extend downward past inlet surface 16 of lower die body 12 and down to the outlet end 30 of the discharge zone, the discharge zone being that portion of the die extending below the outlet surface 32 of lower die body 12 up to outlet end 30. Lower line 32 represents the outlet face die body 12. The outlet face of any die body, for purposes of this invention, is defined by the bottom of the webs in that die body. Webs 22 of the upper die body also extend downward from inlet surface 14 but only to inlet surface 16 of the lower die body. Pins 20 of the lower die body extend from inlet surface 16 to the outlet end 30 of the discharge zone. FIG. 2 shows both sets of pins 18 and 20 ending at outlet end 30, however in order to vary wall geometry of the extruded structure, some or all of the pins in either pin set may extend to different levels within the discharge zone. Feed passages 26 communicate the extrudable mixture from inlet surface 14, across die bodies 10 and 12, and past outlet surface 32 into a discharge zone having a length D.

Figure 3:
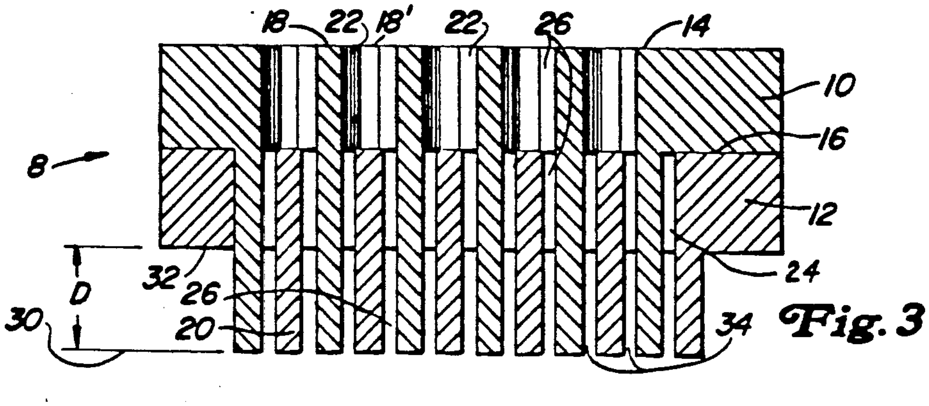
FIG. 3 shows a section of the die taken across line 3—3 of FIG. 1.

The configuration and relative relationship of the feed passages and pin sets are shown more clearly in FIG. 3 which is a cross-section of the die body taken parallel to the faces of the pins. The continuous length of pins 18 cut by section line 3—3 is shown from inlet surface 14 to outlet end 30. Webs 22 diagonally bridge the space between the sectioned pins 18 and the next row of upper die body pins 18′ which are located behind the sectioned pins. The view of pins 18′ below inlet surface 16 is blocked by pins 20 of the lower die body which again extend from inlet surface 16 to outlet end 30. Again, feed passages 26 consist of the large octagonal openings in the upper die body defined by pins 18 and webs 22, and the directly subadjacent area below inlet surface 16 which remains open after insertion of pins 18 through lower die body 12. The lower ends of feed passages 26 communicate with discharge zone D which comprises a series of discharge slots 34. In order to prevent extrudable material from flowing laterally out of the slots 34, cylindrical face 29′ of press jaws 29 blocks the outer circumference of discharge zone D.

FIG. 4 shows the die in three dimensions and illustrates the configuration of discharge zone D. Discharge slots 34 extend in an orthogonal arrangement over length D of the discharge zone and are defined by the mutually perpendicular faces of pins 18 and 20. Slots 34 intersect at the ends of the lateral pin faces. The geometry of slots 34 define the final cross-section of a honeycomb structure that is formed within the discharge zone and ejected through outlet surface 32.

Although the feed passages have an irregular hexagon shape when viewed through the entire die, the portions of pins 18 below webs 22 are completely surrounded by open space that can be filled with extrudable material. By providing the open space around pins 18, channel walls completely surrounding the channel left by pin 18 can be formed upstream of the discharge zone. Thus, in the discharge area, only that portion of the die occupied by webs 24 must be filled by lateral flow of the extrudable material.

In regard to the injection of extrudable material into discharge slots 34, the instant method facilitates this function by maximizing the direct axial communication of extrudable material to the discharge slots. The open area of the feed passages that communicate directly with the discharge slots of the discharge zone have a cross-section that substantially matches the cross-section of the non-intersecting portion of the discharge slots. By this arrangement, the extrudable material has the most open communication with sections of the discharge slots that have the minimum hydraulic diameter. Preferentially, feeding the extrudable material to minimum hydraulic diameter sections of the discharge slots assures that these sections of the discharge slots are completely filled to the maximum density thereby improving the structural strength of the final honeycomb structure and maximizing the quality of the wall sections where they are the thinnest and potentially the weakest. Since the thinnest wall sections have the smallest hydraulic diameters and thus the greatest resistance to flow, lateral movement of the extrudable mixtures into the relatively small area of the discharge slots that lie directly beneath webs 24 is encouraged as the mixture will seek the path of least resistance. As a result, this arrangement of feed passages may allow the overall length of the die to be reduced since the distance over which flow impedance is necessary for distribution is decreased by facilitation of lateral movement by the extrudable material. Additional information on the location of feed passages to introduce extrudable material to the discharge zone at points of increased flow resistance can be obtained from my copending application Ser. No. 946,234 filed Dec 24, 1966 and now U.S. Pat. No. 4,747,986.

Any number of cross-sectional shapes can be formed by this method. These shapes include circles, squares, triangles, ovals, rectangles, hexagons, etc. Preferably, the channel forming pins for forming these shapes will be polygonally shaped. In addition, the slots of the discharge zone may be arranged to provide any number of geometric patterns such as circular, triangular, or rectangular grid works.

An understanding of the shape of each die body and an appreciation of the large clearances between pins can be obtained from FIG. 5 which is an exploded view of the die showing the individual die bodies. Die bodies for practicing this invention are preferably made from a solid block of material. The pins and webs may be formed by removing the base material of the die from the solid blocks through appropriate techniques. It has been found that in order to make very fine honeycombs, having 200 channels per square inch or more, the necessary tolerance and uniformity can be easily achieved by electric discharge machining. However, this die design permits a large portion of the base material between the pins to be removed by simple drilling in a direction parallel to the pins which at the same time can form finished or partially finished feed passages. The final profile of the pins and/or feed passages can then be formed by more precise cutting methods. These other techniques can include the electric discharge machining as previously mentioned. It is also contemplated that laser cutting techniques can be advantageously employed to machine the die. This die design is of particular advantage in the manufacture of honeycomb structures having ultrafine channels, i.e. 600 or more per square inch, since it increases the overall clearance between pins in individual die bodies and simplifies the required cutting operations.

A variety of materials can be used for forming the die. The only requirements are that the material can be formed or machined into the shape of the desired die and will have sufficient strength to withstand the pressure exerted on the die during the extrusion process. A preferred material for the die is cold rolled steel. An advantage of employing burning methods, such as electric discharge machining or laser cutting techniques, to machine that portion of the die from cold rolled steel, is that the die stock may be hardened prior to the machining process.

The forming of channel walls in a honeycomb structure using the die of this invention can be more fully appreciated by describing the flow of extrudable material through the cross-section of the die shown in FIG. 3. Die 8 is placed in the bottom of a cylinder of a hydraulic press, not shown. Extrudable material is pushed by the piston of the press across inlet surface 14. As the extrudable material first contacts the inlet face, it is deflected by pins 18 and webs 22. Deflection by pins 18 and webs 22 subdivide the extrudable material into a series of segments enclosed by the common transverse spaces of pins 18 and webs 22. Since pins 20 do not extend up to the top of inlet surface 14, inlet surface 14 has a large open area for receiving the extrudable material and the only resistance to flow at the inlet surface 14 is created by the lateral deflection of the extrudable material around the relatively small transverse area of pins 18 and webs 22. Since the total number of pins in die body 10 is only half the total number of pins in the die, the extrudable material imposes less overall force on the die body as compared to a die body that supports all of the channel forming pins. As a result, the interconnecting links, i.e., webs 22, between can be made smaller. Contact of the extrudable material with the lateral faces of pins 18 in each segment forms that portion of the channel wall that will eventually border a channel in the final honeycomb structure. Thus, a portion of the channel walls is preformed upstream of the discharge zone by partitioning the extrudable material into the segments. Thus, webs 22 and pins 18 form a partitioning zone that extends the length of webs 22 and initiates formation of final channel walls as soon as the extrudable material enters the die.

As the segments of extrudable material are passed below webs 22 and across inlet surface 16, another portion of the channel walls is formed. That portion of the channel walls that is already formed by contact with the sides of pins 18 maintains its shape as it passes another partitioning zone defined by webs 24 and pins 20. This shape is maintained by the continuous extending of pins 18 to the outlet end 30. The second partitioning zone resubdivides the downward flowing segments into a new arrangement of segments having a shape defined by the common surfaces of pins 20 and webs 24. The only resistance offered to the flow of extrudable material across inlet surface 16 is the transverse area of pins 20 and a portion of the transverse area of webs 24. Thus, the extrudable material must be principally deflected around pins 20 as it crosses inlet surface 16. However, since a portion of the extrudable material has been shaped to at least partially conform to the final structure of the honeycomb, a smaller amount of material must be displaced as it crosses inlet surface 16 so that the total resistance to flow offered by inlet surfaces 16 and 14 is reduced relative to that required to press the extrudable material across an inlet face that has the top of all channel forming elements at one elevation. In addition, the resistance to flow is further reduced since the total transverse area blocking inlet surface 16, i.e. the cross-section of pins 18 and 20 and webs 24, is smaller due to relatively small number of webs 24 that are needed in die body 12. As the extrudable material flows past the lateral faces of pins 20, another portion of the channel walls that define the channels in the final honeycomb structure are formed. The shape of the extrudable material adjacent the lateral surfaces of pins 20 is again maintained throughout the remaining length of the die. Before the extrudable material moves past outlet surface 32 into the discharge zone, the final channel walls of the honeycomb structure are formed to the point that they continuously surround the lateral surfaces of pins 18.

As a result, the only portion of the channel walls that define the final honeycomb structure left to be formed is that occupied by webs 24 in the upstream portion of the die. Only a small amount of lateral flow in the discharge zone is needed to fill in the relatively small spaces occupied by webs 24. As previously pointed out, the majority of the discharge zone is in direct axial alignment with the feed passages defined by the mutually open areas between the pins and webs. Therefore, unlike prior art dies where a majority of the honeycomb structure is formed in the discharge zone, this die can use the discharge zone to fill relatively minor gaps in a honeycomb structure that has been largely defined upstream of the discharge zone.

The clearances between the channel forming pins and the transverse cross-section of the cavities of feed passages can be further increased by using more than two die bodies in a die of this invention. A die arrangement for passing the extrudable material through four partitioning zones is shown in FIG. 6. In FIG. 6, a die 35 composed of four layers of die bodies with a top die body 36, a die body 37 directly below die body 36, another die body 38 directly below die body 37, and a bottom die body 39. Die body 36 has an inlet surface 40 which is open to the flow of extrudable material in a center portion about which rectangular pins 42 are held in a rectangular arrangement by webs 44 that extend from the center of the lateral faces of pins 42. Directly below webs 44 is an inlet surface for die body 37 having an open central portion about which square pins 46 are held in a rectangular arrangement by webs 48. Both sets of webs 48 and 44 are orthogonally arranged in a mutually parallel arrangement with webs 44 offset by half the distance across webs 48. Directly beneath webs 48, die body 38 has square pins 50 held in a square arrangement by webs 52. Each of webs 52 connects the corners of adjacent pins 50. Webs 52 are orthogonally arranged but at a 45-degree angle to webs 44 and 48. Directly below webs 52, a set of square pins 54 is held in a rectangular arrangement by a series of webs 56. Webs 56 connect every other pin 54 at all four corners. The other half of pins 54 are supported at two diagonal corners by webs 56 in an intermediate position half-way between two of pins 54 that are supported at the four corners. Uniform spacing between the die bodies is maintained by a set of screws 58 that extend through all four die bodies and clamp them together in unitary fashion.

Figure 7:
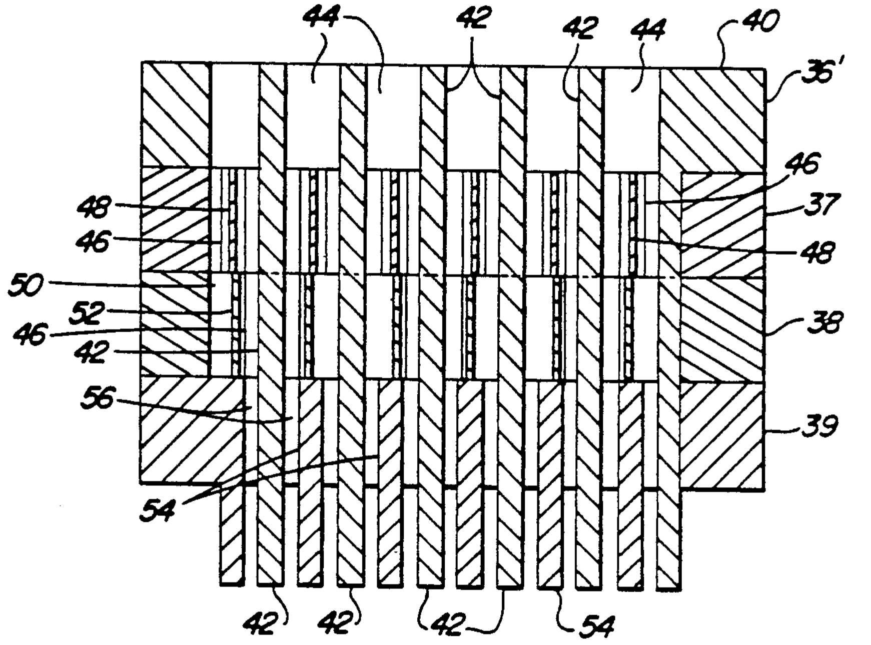
FIG. 7 is a cross-sectional view of the die of FIG. 6 taken across line 7—7.
Figure 8:
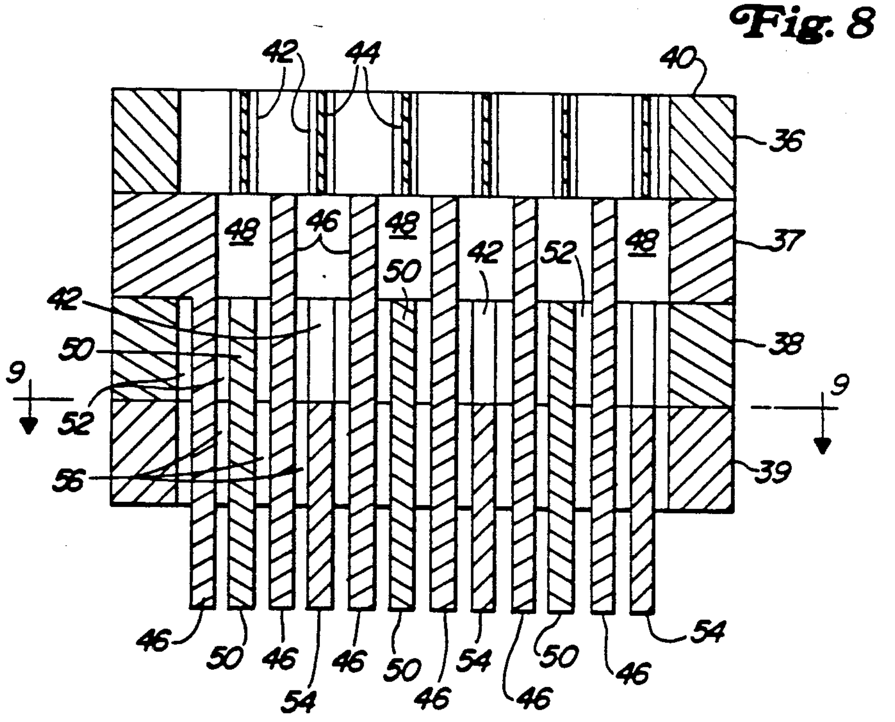
FIG. 8 is a cross-sectional view of the die of FIG. 6 taken across line 8—8.

The die of this invention will be discussed with the aid of FIGS. 7 and 8 by describing the flow of extrudable material through the cross-section of the die. Extrudable material is pressed past inlet face 40 and deflected around pins 42 as it is subdivided in a series of segments by a partitioning zone defined by the lateral faces of pins 42 and webs 44 between the transverse faces of die body 36. Partitioning of the flow forms a shape, on a portion of the segment, that corresponds to the channel walls of the desired honeycomb structure. The flow segments pass from die body 36 across the inlet face of die body 37 and are deflected around the transverse surface of pins 46 and interconnecting webs 48. The portion of pins 46 and webs 48 between the outer ring surfaces of die body 37 define another partitioning zone that again subdivides the flow into a series of segments. The exterior surface of the segments take on the shape of another portion of the channel walls that will define the final honeycomb structure. The extension of pins 42 through the partitioning zone of die body 37 again maintains the channel wall shapes formed in the partitioning zone of die body 36. In addition, the absence of webs 44 from the partitioning zone of die body 37 allows the subadjacent area to be filled with extrudable material and further define the final shape of the walls of the honeycomb structure on the surface of the segments. As the extrudable material is pressed from die body 37 into die body 38, the transverse faces of pins 50 and webs 52 again laterally deflect the extrudable material and subdivide it into another series of segments in a partitioning zone defined by the lateral faces of pins 50 and webs 52. The channel walls are further defined by the lateral surfaces of pins 50 while the extension of pins 42 and 46 through the partitioning zone of die body 38 maintain the form of those portions of the channel walls that have been formed on the surface of the upstream segments. Since pins 42 and 46 are suspended without interconnections in the partitioning zone of die body 38, channel walls can be continuously formed around the entire surface of these pins in the partitioning zone of die body 38. The extrudable material passes from die body 38 into die body 39 where the transverse surfaces of pins 54 and interconnecting webs 56 laterally deflect the extrudable material at the inlet surface of the die and subdivide the extrudable material into yet another series of segments defined by the partitioning zone of die body 39. Like the other partitioning zones, the partitioning zone of die body 39 contains a series of partitions defined by the laterally opposing faces of pins 54 and webs 56. As the extrudable material is pushed past the outer ring of die body 39, it enters a discharge zone that interconnects the volume of the honeycomb structure occupied by webs 56 in the partitioning zone of die body 39.

Figure 9:
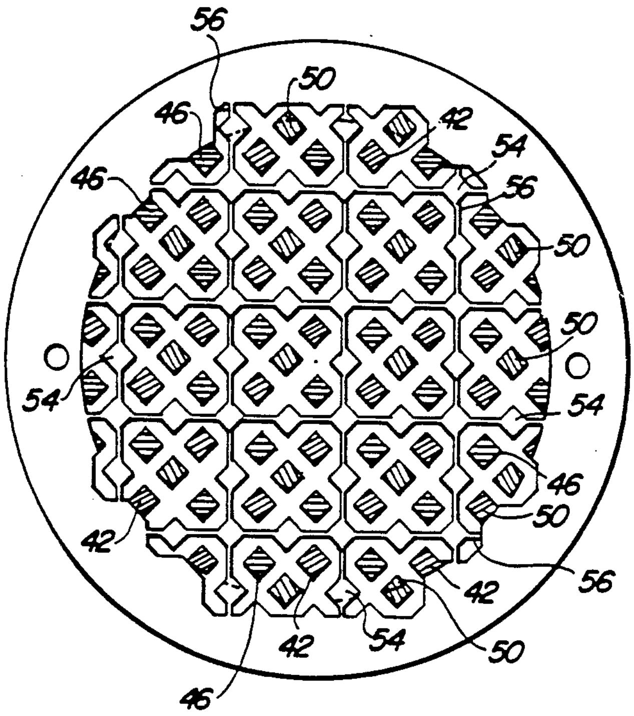
FIG. 9 is a plan view of a lower portion of the die of FIG. 8 taken across line 9—9.

From FIG. 6, it is readily apparent that the transverse area of the cavities in each die body and the spacing between pins is greatly increased relative to prior art die designs as well as the die of FIG. 1. The very large cavities or feed passages of the die bodies shown in FIG. 6 have a general shape that is outlined by the pins and the webs supporting those pins in that die body. FIG. 9 depicts the transverse area of the pins and webs at the inlet surface of die body 39 and the large open areas of the die body that facilitate fabrication. Another advantage of these large openings is the reduced transverse area presented by the inlet surface of the die body which reduces the total force imposed across the pins and webs supported by that die body so that the necessary strength for supporting the pins is more readily achieved with less web material. Therefore, die body 39 has adequate strength even though half of the pins in die body 39 are supported by only two webs.

What is claimed is:

1. A multi-piece die for forming multi-channeled honeycomb structures from extrudable material, said die comprising, a first die body having a first inlet face, an outlet face, an integrally formed set of channel forming pins, and a set of links for interconnecting said channel forming pins, said channel forming pins and links defining a set of cavities through said die body and said channel forming pins extending below said outlet face to partially define a discharge zone, at least one additional die body superimposed, at least in part, above said inlet face of said first die body, having an inlet face, an outlet face, and an integrally formed set of channel forming pins and a set of links for interconnecting said channel forming pins, said channel forming pins of said additional die body extending through said cavities and past the outlet face of said first die body, to partially define said discharge zone, and the integrally formed set of pins in said first die body and the integrally formed set of pins in said at least one additional die body having a minimum pitch between all adjacent pins that exceeds the minimum pitch between all adjacent pins in said discharge zone.

2. The die of claim 1 wherein the transverse cross-sectional area of each cavity exceeds the transverse cross-sectional area of each pin.

3. The die of claim 1 wherein in at least one of said die bodies the pins are polygonally shaped and the links comprise thin webs interconnecting adjacent corners of said pins.

4. The die of claim 1 wherein one set of pins in at least one of said die bodies is arranged on a uniform pitch.

5. The die of claim 1 wherein in at least one of said die bodies the pins are polygonally shaped and said links comprise thin webs interconnecting adjacent pins and said webs are attached to said pins at points between corners of said pins.

6. The die of claim 1 wherein said first die body is a bottom die body having a first set of pins arranged such that each cavity is surrounded by eight pins of said first set of pins and at least two links interconnect each pin in said first die body is a second die body having a second set of pins is superimposed above said first die body, the pins in said second set are arranged on a pitch that at least equals twice the minimum spacing between pins in said first set, a third die body having a third set of pins is superimposed above said first and second die bodies and a fourth die body having a fourth set of pins is superimposed above said first, second, and third die bodies and said third and fourth sets of pins have the same spacing.

7. A multi-piece die for forming multi-channeled extrudable structures having at least 100 channels per square inch from extrudable material said die comprising:

(a) a first die body having an inlet face, an outlet face, and an integrally formed set of channel forming pins and webs interconnecting said channel forming pins, said channel forming pins having a length extending from said inlet face past said outlet face, said webs providing the only attachment to said channel forming pins and said channel forming pins and webs defining a first regular pattern of cavities through said die body;

(b) at least one additional die body superimposed in part above said first die body having an inlet face, an outlet face opposite the inlet face of said first die body, and an integrally formed set of channel forming pins and interconnecting webs, said set of pins in said at least one additional die body having a uniform spacing between all of said pins over the outlet face of said additional die body and a length of said pins extending from the inlet face of said additional die body through said cavities past the outlet face of said first die body, the webs in said additional die body providing the only attachment to the pins in said additional die body, and the pins and webs of said additional die body, defining a regular pattern of cavities through said die body;

(c) means for securing said first die body and said additional die bodies together such that said cavities provide linear flow passages for passing said extrudable material through said die; and (d) a discharge zone defined by the open area between the portion of said pins that extend past the outlet face of said first die body, said discharge zone having an arrangement such that adjacent pins in any of said die bodies have a greater pitch than the pitch between adjacent pins in said discharge zone.

8. A four-piece die for forming multi-channeled extrudable structures having at least 100 channels per square inch from extrudable material said die comprising:

(a) a first die body having a first inlet face, a first outlet face, and an integrally formed first set of channel forming pins and webs interconnecting said channel forming pins, said channel forming pins having a length extending from said inlet face past said outlet face, said webs providing the only attachment to said channel forming pins and said channel forming pins and webs defining a first regular pattern of cavities through said die body;

(b) a second die body superimposed in part above said first die body having a second inlet face, a second outlet face adjacent said first inlet face, and an integrally formed second set of channel forming pins nd interconnecting webs, said channel forming pins in said second set having a uniform spacing between all of said pins over said second outlet face and a length extending from said second inlet face through said cavities past said first outlet face, the webs in said second set providing the only attachment to the pins in said second set, and the pins and webs of said second set defining a second regular pattern of cavities through said second die body;

(c) a third die body superimposed in part above said second die body having a third inlet face, a third outlet face adjacent said second inlet face, and an integrally formed third set of channel forming pins and webs interconnecting said channel forming pins, said channel forming pins having a uniform spacing between all of said pins over said third outlet face and a length extending from said third inlet face past said third outlet face through said first and second sets of cavities and past said first outlet face, said webs providing the only attachment to said channel forming pins and said channel forming pins and webs defining a third regular pattern of cavities through said third die body;

(d) a fourth die body superimposed in part above said third die body having a fourth inlet face, a fourth outlet face adjacent said third inlet face, and an integrally formed fourth set of channel forming pins and interconnecting webs, the pins in said fourth set having the same spacing as the pins in said third set and a length extending from said fourth inlet face through said third, second and first sets of cavities and past said first outlet face, the webs in said fourth set providing the only attachment to the pins in said fourth set, and the pins and webs of said fourth set defining a fourth regular pattern of cavities through said fourth die body;

(e) means for securing said first, second, third and fourth die bodies together such that said cavities provide linear flow passages for passing said extrudable material through said die; and (f) a discharge zone defined by the open area between the portion of said pins that extend past said first outlet face and said discharge zone having an arrangement such that adjacent pins in any of said die bodies have a greater pitch than the pitch between adjacent pins in said discharge zone.

9. The die of claim 8 wherein said cavities are generally square in shape and the width of said fourth set of cavities equals the width of said third set of cavities, the width of said second set of cavities exceeds the width of said third set of cavities and the width of said second set of cavities equals the width of said first set of cavities.

10. The die of claim 9 wherein said first set of cavities is defined by at least eight pins and half of the pins bordering each cavity in said fourth set are interconnected by only two webs.

11. The die of claim 10 wherein said pins are polygonally shaped.

12. The die of claim 11 wherein the pins in said second, third, and fourth sets are interconnected by at least four webs.

13. The die of claim wherein said pins have a square cross-section and pins in said first and second sets are interconnected at adjacent corners and adjacent pins in said third and fourth sets are interconnected to pin surfaces between corners of said pins.

* * * * *

UNITED STATES PATENT AND TRADEMARK OFFICE
CERTIFICATE OF CORRECTION

PATENT NO. : 4,846,657

DATED : July 11, 1989

INVENTOR(S) : Tai-Hsiang Chao

It is certified that error appears in the above-identified patent and that said Letters Patent is hereby corrected as shown below:

Title page:

Abstract, line 12: "cavity" should read --cavities--.
Column 7, line 23: "1966" should read --1986--.
Column 8, line 42: "extending" should read --extension--.
Column 11, line 31: "first die body is a second die" should read --first die body, a second die--.
Column 12, line 29: "nd" should read --and--.
Column 14, line 9: insert --12-- after "claim"

Signed and Sealed this

Twenty-ninth Day of May, 1990

*Attest:*

HARRY F. MANBECK, JR.

*Attesting Officer* *Commissioner of Patents and Trademarks*